United States Patent Office 2,919,982
Patented Jan. 5, 1960

2,919,982
PRETREATMENT OF ILMENITE ORE

Luther D. Fetterolf, Palmerton, Pa., assignor, by mesne assignments, to Quebec Iron and Titanium Corporation, Tracy, Quebec, Canada, a corporation of Canada No Drawing. Application November 25, 1955
Serial No. 549,189

17 Claims. (Cl. 75—1)

This invention relates to the pretreatment of ilmenite ore, and more particularly, to improvements in the smeltability of ilmenite ore. The invention further relates to modified and beneficiated ilmenite ores having enhanced smelting characteristics.

Ilmenite is ferrous titanate ($FeO \cdot TiO_2$), and contains approximately equal proportions of titanium dioxide and iron oxides. Although ilmenite is found in minute amounts practically wherever igneous rocks are known, there are several locations throughout the world where ilmenite ore forms rich segregations in the surrounding igneous rocks and exists in massive deposits. In the development of such deposits, numerous efforts have been directed towards producing marketable pig iron from the ore by conventional smelting methods, but these efforts have been accompanied by a plethora of indifferent and economically unsuccessful results. The origin of the difficulties can be ascribed to the adverse effects of the titanium upon the behaviour of the slag produced, and these difficulties, especially the erratic behaviour of the fluidity of the slag, have presented an impasse to the commercial utilization of ilmenite ore.

Resolution of the impasse was accomplished through the exhaustive investigation into the titanium slag concentrate which resulted in development of the ilmenite smelting process and titaniferous slag concentrate described in the United States patent to Peirce et al. No. 2,476,453. During this development of a titanium slag concentrate containing at least 60 percent titanium oxide (calculated as $TiO_2$), as described in the Peirce et al. patent, several essential relationships were discovered to govern the slag chemistry. These relationships inexorably fix the fluidity of the slag. As explained in the Peirce et al. patent, a desirable characteristic of the slag concentrate resides in its controlled content of reduced titanium oxides, collectively referred to as trivalent titanium oxide ($Ti_2O_3$). The amount of reduced titanium oxides present in the slag concentrate varies inversely to its content of ferrous oxide. Thus, a minimum ferrous oxide content of about 2 percent (calculated as Fe) corresponds to the most highly reduced slag concentrates and hence to the highest reduced titanium oxide content, which is equivalent to a viscid, highly refractory slag concentrate. At higher contents of reduced titanium oxides, and corresponding to less than about 2 percent ferrous oxide (calculated as Fe), there is also a tendency for the molten slag to stiffen, with resulting impairment in the efficiency of the reducing operation. As further explained in the Peirce et al. patent, an upper limit of about 20 percent ferrous oxide (calculated as Fe) corresponds to the least highly reduced slag concentrate, and hence to the lowest reduced titanium oxide content, which characterizes a free-flowing, sulphuric acid-digestible slag concentrate. Thus, the fluidity of these titanium slag concentrates may be said to be a function of their ferrous oxide content within the aforementioned limits.

As the fluidity of the aforementioned titanium slag concentrates is related to their ferrous oxide content, so the fluidity and solidification point of the molten pig iron depends upon the amount of carbon dissolved in the iron. In turn, the affinity of iron for carbon is markedly influenced by the sulphur content of the iron. As the sulphur content of the iron is decreased, the solubility of carbon in iron is increased, with a resultant lowering of the solidification point of the iron. Thus, the physical properties of both the slag concentrate and the molten iron are intimately associated with the slag chemistry which imposes the limitations upon the allowable conditions used in smelting ilmenite ore.

The limitations imposed by the slag chemistry upon the smelting conditions have led to many practical difficulties in operating the electric arc furnaces used in smelting ilmenite ore. In current practice, the ilmenite ore, admixed with a controlled amount of a carbonaceous reducing agent, is charged to the furnace from side banks, permitting the electric arcs to remain exposed. In common with all solid free-flowing materials, the side bank assumes an angle of repose characteristic of ilmenite ore. Prior to the present invention, there was a pronounced tendency for the side banks to build up and then to collapse suddenly. This was due to the peculiar crusting, sintering and melting characteristics of raw ilmenite ore which collectively influence the flowability of the ore. This collapse occurred regardless of the particle size distribution of the ilmenite ore, for both relatively coarse charges as well as those of very fine particle size underwent similar sudden collapse rather than smooth progressive melting and flow down the sloping banks.

Sudden collapse of the side banks has been found to be the cause of a perilous sequence of events. As the relatively cool solid charge containing readily available carbon collapsed into the molten slag bath, there was an immediate reduction of the ferric oxide in the raw charge in addition to the continuing reduction of the ferrous oxide content of the molten slag with resulting voluminous evolution of carbon monoxide; the higher the ferrous oxide content of the slag, the more voluminous the gas evolution. The temperature of the molten slag bath was therefore quickly lowered by the relatively cool solid charge and by the endothermic smelting reaction, whereupon the slag became exceedingly viscous. The aforementioned gas evolution in the viscous slag resulted in the formation of foam which boiled up towards the roof of the furnace. With automatic electrode control, the encroachment of the rising foam about the electrodes caused them to be automatically raised, so that the electric arc between the electrodes approached the level of the furnace roof. Even though the power was immediately cut off, to avoid heating the roof by the approaching arcs, the rising hot foam tended to attack the furnace arch with injurious effects.

In continuous commercial smelting operations, the aforementioned injurious effects attributable to charge bank collapse are particularly difficult to control once initiated, and are especially serious in a large-scale multielectrode furnace.

It will be seen that although the distinct advantages of desirable fluidity and efficient power consumption are present when ilmenite is smelted so that the slag concentrate is made to approach its preferred upper limit in ferrous oxide content, the smelting advantages of high fluidity and efficient power consumption are counteracted by the damage caused by side-bank collapses.

I have now discovered that a certain pretreatment of ilmenite ore results in an improvement in the stability, in the sense of freedom from sudden collapses, of the sidewall charge banks in the furnace which, in turn, leads to enhanced smoothness in the smelting operation resulting from beneficial modification of the reducibility and melting point of the pretreated ore. This modification of the ore is obtained, I have found, by treating the ilmenite ore in the substantially complete absence of solid carbonaceous matter to a temperature of about 1000° C.–1200° C. for an effective period of time. The modification of ilmenite by the heating operation of the invention is such that it can be said to exhibit improved smeltability characteristics.

The smeltability of ilmenite ore is determined by at least three separate characteristics, namely, the flowability, the reducibility and the melting point of the ore. The flowability of the solid charge, when introduced into the furnace from sloping side-wall banks, is related to the angle of repose of the ore in the furnace during smelting, and hence is indicative of the flow properties of the ore. Untreated ilmenite ore tends to build up into rather steep, hard crusted banks, which often suddenly collapse into the molten slag bath with perilous results. I have discovered that pretreated ilmenite ore shows a greatly enhanced flowability. Although this improvement may be accompanied by a change in the angle of repose in the furnace, it is demonstrated by the more uniform downward movement or gradual self-feeding of the pretreated ore from the sloping side banks towards the smelting zone.

Reducibility of the ore is the second characteristic determining smeltability, and is a term used herein to indicate the rate at which the ore is reduced in the smelting zone under specific smelting conditions. Pretreatment of ilmenite ore markedly accelerates the reducibility of the ore, for under identical smelting conditions ilmenite ore pretreated pursuant to my invention is reduced at a faster rate than raw ilmenite ore. Thus, pretreatment of the ore, accompanied by a favorable change in the kinetics of reduction, accomplishes the added economic advantage of increasing the throughput of the furnace.

The third factor governing smeltability is the melting point of the ore, which serves as a convenient index of the energy required to melt the ilmenite. I have found that pretreatment of the ore modifies the chemical structure in such manner as to appreciably lower the melting point of the ore, the extent of the lowering of the melting temperature being as high as 50° C. when the pretreatment is performed under relatively strong surface oxidizing conditions.

To effect the aforementioned improvement in smeltability pursuant to my invention, regular stock-pile ilmenite must be heated, in the substantially complete absence of solid carbonaceous matter, to a temperature of 1000°–1200° C. for an effective period of time. Although 15 minutes has been found to be the minimum retention period for pretreatment temperatures of about 1000°–1100° C., commercial-scale operating conditions have shown it to be more advantageous to retain the ore somewhat longer at this temperature, generally for one-half hour. Under comparable commercial conditions, the retention period varies inversely with the temperature of pretreatment; hence operation at a temperature of 1000° C. requires approximately one-half hour for completion, while a similar operation at a temperature of 1200° C. requires retention for only about one-quarter hour to achieve the same results. However, coarser particle sized ores at any treating temperature require somewhat longer retention periods than the finer sized ores. The aforementioned retention periods are nevertheless representative and are the periods generally required for an ore ground and sized to through ½ inch and on 200 mesh (Tyler standard).

While the choice of suitable equipment is dictated by process requirements, I have found that a rotary kiln, containing conventional control devices, is particularly advantageous in commercial operations, for the use of such a rotary kiln is amenable to close control of both the time and temperature required for completion of the pretreatment.

The inverse relationship of time with temperature during pretreatment is substantially unaltered by the atmosphere present in the kiln. Although there are additional measurable changes when ilmenite is heated under strongly oxidizing conditions, the modification, and hence the improvement in smeltability, proceeds equally expeditiously under both neutral and even slightly reducing atmosphere within the kiln. This is an indication that the physical and chemical changes observed in kiln-treated ilmenite are the result of a series of internal reactions, occurring irrespective of the atmosphere within the kiln. It is probably due to these physical and chemical changes that the beneficial results of kiln treatment accrue.

Upon consideration of the physical and chemical changes which result from kiln treatment of raw ilmenite, the beneficial results are capable of explanation. The retention of raw ilmenite ore for not less than 15 minutes within the temperature range of 1000° to 1200° C. in a neutral or oxidizing atmosphere produces several important changes. The sulphur content of the ore is lowered by an in situ oxidation of the sulphide minerals by hematite with the production of magnetite accompanied by the evolution of sulphur dioxide. When the pretreatment is accomplished under surface oxidizing conditions, by passing air through the heated kiln, the formation of pseudobrookite ($Fe_2O_3 \cdot TiO_2$) also occurs. The reaction appears to be merely a surface phenomenon, whose rate and extent are dependent upon the particle size distribution of the ore. Use of a neutral atmosphere in the kiln does not result in any appreciable formation of pseudobrookite.

In both a neutral and oxidizing atmosphere, kiln treatment of the raw ore under the aforementioned conditions of time and temperature results in a phase change within the ore particles. X-ray analyses indicate that a solid solution of $xFeO \cdot TiO_2 \cdot yFe_2O_3$ is formed between ilmenite ($FeO \cdot TiO_2$) and the residual hematite which is not reduced in situ to magnetite by the mineral sulphides. The kiln treated ore contains less than 0.05 percent sulphur, possesses magnetic properties due to the formation of magnetite, and has a modified molecular structure as a result of the presence of the solid solution of $xFeO \cdot TiO_2 \cdot yFe_2O_3$ between hematite and ilmenite. The formation of magnetite permits the kiln-treated ore to be further beneficiated by low intensity magnetic separation, producing a beneficiated magnetic fraction, containing less than 0.5 percent free gangue. In this manner, the furnace ore may be improved to "96 grade," i.e., containing amounts of titanium oxide and iron oxide totaling 96% of the beneficiated ore.

In smelting the pretreated ore, several process advantages are obtained as a culmination of the changes in composition and properties of the modified ore. For example, the resulting modified ore has a sulphur content of less than 0.05 percent. In normal smelting operation, a substantial proportion of the sulphur leaves the furnace as iron sulphide in solution with the iron; but by decreasing the sulphur content of the furnace charge, the concentration of iron sulphide in liquid iron is therefore lowered. As the sulphur content in the liquid iron is diminished, the solubility of carbon in iron is increased as shown in the following analyses, the slag composition remaining the same:

TABLE I

| Furnace Smelt Charge | Furnace Iron Tap | |
| --- | --- | --- |
| | Carbon, Percent | Sulphur, Percent |
| Regular Ilmenite | 1.2 | 0.50 |
| Pretreated Ilmenite | 1.8 | 0.20 |

Not only does the molten iron obtained by smelting the pretreated ore contain less sulphur, which is beneficial in subsequent desulphurization procedure, but it possesses an increased fluidity and a lower solidification point due to its higher carbon content.

In conjunction with the lower sulphur content, the modifications in physical structure, accruing from the formation of a solid solution of $x$FeO·TiO$_2$·$y$Fe$_2$O$_3$ between hematite and ilmenite, greatly alter the flow characteristics of the heat-treated ore. When kiln treatment is conducted under surface oxidizing conditions, the additional modification in physical structure resulting from the formation of pseudobrookite within the surface of the modified ore particles similarly contributes towards an improvement in the flowability, melting and feeding characteristics of the ore. The immediate consequence of this improved flowability may be demonstrated by the more uniform downward movement or gradual self-feeding of the pretreated ore from the sloping side banks towards the smelting zone of the furnace, thereby diminishing the tendency for precipitous bank collapses into molten slag bath. The consequence of this improved flowability of the furnace charge is more efficient absorption of smelting energy.

A further increase in energy absorption is obtained by beneficiation of the ore prior to or following the heat-treatment of the invention. By thus up-grading the ore, the iron content of the titanium slag concentrate may be increased while maintaining a constant titanium dioxide concentration. The following table illustrates the change in slag chemistry obtained from beneficiation by low-intensity magnetic separation of pretreated ore to obtain different grades of ore:

TABLE II

| Ore Grade (Total Titanium Oxide and Iron Oxide Content, Percent) | Slag | |
|---|---|---|
| | TiO$_2$, Percent | Fe, Percent |
| 88 | 72 | 6 |
| 93 | 72 | 11 |

As the iron concentration of the titanium slag concentrate increases, the energy required for smelting decreases. Furthermore, as the titanium slag concentrate approaches a maximum permissible iron content, the slag becomes more fluid and is more easily controlled.

Recapitulating the foregoing discussion, it will be seen that pretreatment of ilmenite by the heating operation of my invention improves the flowability of the ore, as hereinbefore explained, and hence diminishes the tendency for severe bank collapses into the molten slag bath. At the same time, this pretreatment, accompanied by up-grading the ore, makes possible an increased ferrous oxide content in the titanium slag concentrate without sacrificing its desirable high concentration of titanium oxide. Thus, ilmenite heat-treated pursuant to my invention may be smelted so that the resulting slag concentrate is made to approach its most desirable upper limit in ferrous oxide content with lessened danger of side bank collapse into this molten high iron-containing slag concentrate.

The following specific examples are illustrative of the practice of the invention:

*Example I*

Raw ilmenite ore, screen sized to through ½ inch and on 200 mesh (Tyler standard) and analyzing at 89 grade (i.e., the sum of both the titanium oxide and iron oxide is 89% by weight), was heated in an internally-fired rotary kiln to 1000° C. and maintained at that temperature for 30 minutes. The heat-treated ore exhibited a very strong magnetic susceptibility and showed under X-ray analysis, that an advanced state of a solid solution of $$x\text{FeO·TiO}_2\text{·}y\text{Fe}_2\text{O}_3$$

had formed between hematite and ilmenite. The following table illustrates the change in sulphur content of the ore occurring as a result of the heat-treatment:

TABLE III

| | Untreated Ore, Percent | Heat-Treated Ore, Percent |
|---|---|---|
| Fe | 40.0 | 40.0 |
| S | 0.3 | 0.017 |

Upon smelting the heat-treated ore, using 10.5 parts of coal per 100 parts of ore, several improvements were observed in the smelting characteristics of the treated ore relative to the performance of a corresponding raw ore charge. Not only had frothing been minified throughout smelting of the treated charge, but the boiling action of the molten slag bath was decidedly less pronounced. In addition, the side wall charging banks of the treated charge did not form hard crusts, but gradually underwent self-feeding into the smelting zone, where reduction occurred quite readily. Analysis of the slag concentrate showed a titanium dioxide content of 70.5 percent, and a ferrous oxide content (calculated as Fe) of 5.5 percent. In the metallic iron product, the carbon content was found to be 1.2 percent, with a sulphur content of only 0.20 percent. By way of contrast, smelting of an untreated charge under identical smelting conditions, gave a metallic iron product having a sulphur content of 0.45 percent.

*Example II*

In a manner similar to that of Example I, the same raw ilmenite ore (grade 89) was heated in a rotary kiln to 1100° C. and retained at that temperature for a period of 15 minutes. After quenching the hot ore in a water-spray, it was observed that the treated ore exhibited a very strong magnetic susceptibility due to the formation of some magnetite. Crystallographic investigation, by X-ray analysis, of the treated ore showed the characteristic solid solution of $x$FeO·TiO$_2$·$y$Fe$_2$O$_3$ between hematite and ilmenite and the existence of some pseudobrookite. Analysis of the treated ore indicated an iron content of 41.7 percent, and a sulphur content of only 0.005 percent.

Upon smelting of the treated ore with a solid carbonaceous reductant, those improvements in smelting behaviour, noted in Example I, were also observed.

*Example III*

Raw ilmenite ore (89 grade, as in Example I) was heat treated in an internally fired rotary kiln pursuant to the conditions of Example I. The treated ore exhibited a very strong magnetic susceptibility in a neutral atmosphere and showed by X-ray analysis the existence of the characteristic solid solution of ferric oxide in ilmenite, $x$FeO·TiO$_2$·$y$Fe$_2$O$_3$. The sulphur content of the treated ore was 0.03 percent.

The treated ore was thereupon subjected to low-intensity magnetic separation, with 88 percent by weight of ore recoverable in the magnetic concentrate. Analyses of both the magnetic and non-magnetic fractions, contained in Table IV, illustrates the degree of beneficiation of the classified treated ore:

TABLE IV

| | Magnetic Concentrate, Percent | Non-Magnetic Concentrate, Percent |
|---|---|---|
| TiO$_2$ | 36.9 | 19.8 |
| Fe | 42.8 | 27.6 |
| Ore grade | 95 | 50+ |

Smelting of the heat-treated magnetic fraction, using 11 parts of coal to 100 parts of ore, was accomplished in an electric arc furnace. The smelting behaviour was characteristically improved in that the side wall charge banks gradually moved downwardly to the smelting zone, no hard crusts were formed on the side banks and the amount of frothing in the molten slag bath was adjudged to be very slight.

Analysis of the tapped slag concentrate showed a titanium oxide content of 72.8 percent, and ferrous oxide content (calculated as Fe) of 11.0 percent. Thus, the heat-treatment followed by low-intensity magnetic separation, permitted the ore to be smelted so that the resulting slag concentrate was made to approach a high limit in ferrous oxide content, while diminishing the number of side bank collapses in the molten slag concentrate. In addition, the metallic iron product had the unusually low sulphur content of 0.18 percent.

I claim:

1. The method of improving the smeltability of a hematite-containing ilmenite ore which comprises heating a charge consisting of the ore in the substantially complete absence of solid carbonaceous matter to a temperature of about 1000–1200° C. for a period sufficiently long to cause the formation of a solid solution of the hematite in the ilmenite component of the ore conforming substantially to the formula $x\text{FeO} \cdot \text{TiO}_2 \cdot y\text{Fe}_2\text{O}_3$ and thus concurrently effecting an improved flowability, an increased rate of reducibility and a lowered melting point of the resulting modified ore, and thereafter smelting the modified ore.

2. The method of improving the smeltability of a hematite-containing ilmenite ore which comprises heating a charge consisting of the ore in the substantially complete absence of solid carbonaceous matter and in an indifferent gaseous atmosphere to a temperature of about 1000–1200° C. for a period of not less than about 15 minutes, thereby causing the formation of a solid solution of the hematite in the ilmenite component of the ore conforming substantially to the formula $$x\text{FeO} \cdot \text{TiO}_2 \cdot y\text{Fe}_2\text{O}_3$$

and thus concurrently effecting an improved flowability, an increased rate of reducibility and a lowered melting point of the resulting modified ore, and thereafter smelting the modified ore.

3. The method of improving the smeltability of a hematite-containing ilmenite ore which comprises heating a charge consisting of the ore in the substantially complete absence of solid carbonaceous matter and in a surface-oxidizing atmosphere to a temperature of about 1000–1200° C. for a period of not less than about 15 minutes, thereby causing the formation of a solid solution of the hematite in the ilmenite component of the ore conforming substantially to the formula $$x\text{FeO} \cdot \text{TiO}_2 \cdot y\text{Fe}_2\text{O}_3$$

and thus concurrently effecting an improved flowability, an increased rate of reducibility and a lowered melting point of the resulting modified ore, and thereafter smelting the modified ore.

4. The method of improving the smeltability of a hematite-containing ilmenite ore which comprises heating a charge consisting of the ore in the substantially complete absence of solid carbonaceous matter to a temperature of about 1200° C. for approximately 15 minutes, thereby causing the formation of a solid solution of the hematite in the ilmenite component of the ore conforming substantially to the formula $$x\text{FeO} \cdot \text{TiO}_2 \cdot y\text{FE}_2\text{O}_3$$

and thus concurrently effecting an improved flowability, an increased rate of reducibility and a lowered melting point of the resulting modified ore, and thereafter smelting the modified ore.

5. The method of improving the smeltability of a hematite-containing ilmenite ore which comprises heating a charge consisting of the ore in the substantially complete absence of solid carbonaceous matter to a temperature of about 1000°–1100° C. for approximately 30 minutes, thereby causing the formation of a solid solution of the hematite in the ilmenite component of the ore conforming substantially to the formula $$x\text{FeO} \cdot \text{TiO}_2 \cdot y\text{Fe}_2\text{O}_3$$

and thus concurrently effecting an improved flowability, an increased rate of reducibility and a lowered melting point of the resulting modified ore, and thereafter smelting the modified ore.

6. The method of improving the smeltability of a hematite-containing ilmenite ore which comprises heating a charge consisting of the ore in the substantially complete absence of solid carbonaceous matter to a temperature of about 1000°–1200° C. for a period sufficiently long to cause the formation of a solid solution of the hematite in the ilmenite component of the ore conforming substantially to the formula $x\text{FeO} \cdot \text{TiO}_2 \cdot y\text{Fe}_2\text{O}_3$ and thus concurrently effecting an improved flowability, an increased rate of reducibility, a lowered melting point and an increased magnetic susceptibility of the resulting modified ore, and thereafter smelting the modified ore.

7. The method of beneficiating a hematite-containing ilmenite ore which comprises heating a charge consisting of the ore in the substantially complete absence of solid carbonaceous matter to a temperature of about 1000°–1200° C. for a period sufficiently long to cause the formation of a solid solution of the hematite in the ilmenite component of the ore conforming substantially to the formula $x\text{FeO} \cdot \text{TiO}_2 \cdot y\text{Fe}_2\text{O}_3$ and thus concurrently effecting an improved flowability, an increased rate of reducibility, a lowered melting point and an increased magnetic susceptibility of the resulting modified ore; subjecting the thus-modified ilmenite ore to low-intensity magnetic separation; recovering the resulting beneficiated ore, and thereafter smelting the modified ore.

8. The method of beneficiating a hematite-containing ilmenite ore which comprises classifying a charge consisting of the ore into relatively heavy and light fractions; heating the heavy fraction in the substantially complete absence of solid carbonaceous matter to a temperature of about 1000°–1200° C. for a period sufficiently long to cause the formation of a solid solution of the hematite in the ilmenite component of the heavy fraction conforming substantially to the formula $x\text{FeO} \cdot \text{TiO}_2 \cdot y\text{Fe}_2\text{O}_3$ and thus concurrently imparting thereto an improved flowability, an increased rate of reducibility, a lowered melting point and an increased magnetic susceptibility; subjecting the thus-modified heavy fraction to low-intensity magnetic separation; recovering the beneficiated ore fraction, and thereafter smelting the modified ore.

9. A modified hematite-containing ilmenite ore characterized by a low sulphide-sulphur content, enhanced magnetic properties, and the presence within the ore particles of a solid solution of $x\text{FeO} \cdot \text{TiO}_2 \cdot y\text{Fe}_2\text{O}_3$ between ilmenite and hematite.

10. A modified hematite-containing ilmenite ore characterized by a low sulphide-sulphur content, enhanced magnetic properties, the presence within the ore particles of a solid solution of $x\text{FeO} \cdot \text{TiO}_2 \cdot y\text{Fe}_2\text{O}_3$ between ilmenite and hematite, and the presence of pseudobrookite in the surface portion of the ore particles.

11. A modified hematite-containing ilmenite ore characterized by a sulphide-sulphur content of less than 0.05 percent, by the presence within the ore particles of a solid solution of $x\text{FeO} \cdot \text{TiO}_2 \cdot y\text{Fe}_2\text{O}_3$ between ilmenite and hematite, and by the presence of a significant amount of magnetite.

12. A modified hematite-containing ilmenite ore characterized by a sulphide-sulphur content of less than 0.05 percent, by the presence within the ore particles of a solid solution of $x\text{FeO} \cdot \text{TiO}_2 \cdot y\text{Fe}_2\text{O}_3$ between ilmenite and hematite, by the presence of a significant amount of magnetite, and by the presence of pseudobrookite in the surface portion of the ore particles.

13. A beneficiated hematite-containing ilmenite ore characterized by a low sulphide-sulphur content, enhanced magnetic properties, and the presence within the ore particles of a solid solution of $x\text{FeO}\cdot\text{TiO}_2\cdot y\text{Fe}_2\text{O}_3$ between ilmenite and hematite.

14. A beneficiated hematite-containing ilmenite ore characterized by a low sulphide-sulphur content, by a free gangue content of less than 0.5 percent, by the presence within the ore particles of solid solution of $$x\text{FeO}\cdot\text{TiO}_2\cdot y\text{Fe}_2\text{O}_3$$

between ilmenite and hematite and by the presence of a significant amount of magnetite.

15. A beneficiated hematite-containing ilmenite ore characterized by a low sulphide-sulphur content, by a free gangue content of less than 0.5 percent, by the presence within the ore particles of a solid solution of $$x\text{FeO}\cdot\text{TiO}_2\cdot y\text{Fe}_2\text{O}_3$$

between ilmenite and hematite, by the presence of a significant amount of magnetite, and by the presence of pseudobrookite in the surface portion of the ore particles.

16. A beneficiated hematite-containing ilmenite ore characterized by a sulphide-sulphur content of less than 0.05 percent, by a free gangue content of less than 0.5 percent, by the presence within the ore particles of a solid solution of $x\text{FeO}\cdot\text{TiO}_2\cdot y\text{Fe}_2\text{O}_3$ between ilmenite and hematite, and by the presence of a significant amount of magnetite.

17. A beneficiated hematite-containing ilmenite ore characterized by a sulphide-sulphur content of less than 0.05 percent, by a free gangue content of less than 0.5 percent, by the presence within the ore particles of a solid solution of $x\text{FeO}\cdot\text{TiO}_2\cdot y\text{Fe}_2\text{O}_3$ between ilmenite and hematite, by the presence of a significant amount of magnetite, and by the presence of pseudobrookite in the surface portion of the ore particles.

References Cited in the file of this patent
UNITED STATES PATENTS

| | | |
|---|---|---|
| 2,339,808 | Ravnestad et al. | Jan. 25, 1944 |
| 2,631,941 | Cole | Mar. 17, 1953 |
| 2,750,255 | Creitz et al. | June 12, 1956 |
| 2,758,019 | Daubenspeck et al. | Aug. 7, 1956 |